United States Patent
Klotzbuecher et al.

(10) Patent No.: US 7,598,904 B2
(45) Date of Patent: Oct. 6, 2009

(54) METHOD AND MEASURING DEVICE FOR DETERMINING A RELATIVE VELOCITY

(75) Inventors: Dirk Klotzbuecher, Würzburg (DE); Wolfgang Lauer, Heilbronn (DE)

(73) Assignee: Autoliv ASP, Inc., Ogden, UT (US)

( * ) Notice: Subject to any disclaimer, the term of this patent is extended or adjusted under 35 U.S.C. 154(b) by 1 day.

(21) Appl. No.: 12/102,440

(22) Filed: Apr. 14, 2008

(65) Prior Publication Data

US 2008/0266170 A1    Oct. 30, 2008

(30) Foreign Application Priority Data

Apr. 30, 2007    (DE) .................. 10 2007 020 264

(51) Int. Cl.
*G01S 13/42*    (2006.01)
*G01S 13/93*    (2006.01)

(52) U.S. Cl. .................. 342/107; 342/70; 342/109; 342/113; 342/114; 342/115; 340/435; 340/436; 340/903

(58) Field of Classification Search ............. 342/70–72, 342/104, 107–115; 340/435, 436, 903
See application file for complete search history.

(56) References Cited

U.S. PATENT DOCUMENTS

| | | | | |
|---|---|---|---|---|
| 3,102,263 A | * | 8/1963 | Meyer | 342/113 |
| 3,833,906 A | * | 9/1974 | Augustine | 342/59 |
| 6,300,896 B1 | * | 10/2001 | Kull et al. | 342/104 |
| 7,248,208 B2 | * | 7/2007 | Hager et al. | 342/120 |
| 2008/0266170 A1 | * | 10/2008 | Klotzbuecher et al. | 342/113 |

FOREIGN PATENT DOCUMENTS

| | | | |
|---|---|---|---|
| DE | 3540426 A1 | | 5/1986 |
| EP | 1014108 A1 | * | 6/2000 |
| GB | 2244405 A | | 11/1991 |
| JP | 07140245 A | * | 6/1995 |

* cited by examiner

*Primary Examiner*—John B Sotomayor
(74) *Attorney, Agent, or Firm*—Sally J Brown

(57) ABSTRACT

The present invention relates to a method and device for determining a relative velocity between a host (100) and a target (102). The present invention relates in particular to a method of the type that can be used in motor vehicle radar systems and specifically in radar systems of the type that detect obstacles in a blind spot of a motor vehicle. In the method according to the invention the following steps are carried out: substantially simultaneously determining a value for a radial velocity and a bearing with regard to a predefined spatial direction for a large number of measurement points (106) on the target (102); calculating a large number of quotients from the radial velocity and the cosine of the associated bearing, a quotient being calculated for each of the measurement points (106); determining an estimated relative velocity between the host (100) and the target (102) by forming an average of the large number of quotients.

10 Claims, 1 Drawing Sheet

METHOD AND MEASURING DEVICE FOR DETERMINING A RELATIVE VELOCITY

CROSS-REFERENCE TO RELATED APPLICATIONS

This application claims the benefit of the filing date under 35 U.S.C. § 119(a)-(d) of German Patent Application No.: DE 10 2007 020 264.6, filed Apr. 30, 2007.

FIELD OF THE INVENTION

The present invention relates to a method and a device for determining a relative velocity between a host and a target. The present invention relates in particular to a method and device of the type that can be used in motor vehicle radar systems and specifically in radar systems of the type that detect obstacles.

BACKGROUND

A problem which frequently occurs in the steering of motor vehicles is the difficulty in noticing obstacles in proximity to the motor vehicle which are located in a position not easily seen by the driver. A position such as this is conventionally known as the blind spot. A blind spot of this type is located, for example, in a direction of 90° to 170° from the direction of travel, both to the left and to the right of the motor vehicle. It is important for the driver of a motor vehicle to be alerted to the presence of obstacles in the blind spot, particularly when turning or changing lanes in a multi-lane road or highway.

Specially configured rear view mirrors or video cameras have been used to address this problem. These options do not provide adequate safety for the most part, as they must be visually evaluated by the driver, and in addition, in the case of the video camera, use relative complex technology.

It is also known to equip motor vehicles with radar systems which detect the presence of an obstacle in the blind spot of a vehicle and automatically produce a signal which alerts the driver of the vehicle to the presence of the obstacle.

Systems of this type must determine the relative velocity between the vehicle in which they are fitted and the potential obstacle in order to distinguish the obstacle from stationary objects. The commonly used terms, "host" and "target" will be used hereinafter for the vehicle equipped with the measuring system and the obstacle to be detected respectively.

A problem exists in that the absolute difference in velocity between two systems has to be estimated. Moreover, this type of problem is also significant in other areas of application, such as in aeronautical or rail engineering.

Considering the situation shown in FIG. 1, in which a system a and a system b travel with respective velocities $V_a$ and $V_b$, the simplest way of determining a differential velocity $\Delta V = V_b - V_a$ is to observe the relative trajectory, also known as the object track, as a function of time. The temporal derivative of this trajectory thus directly represents the differential velocity.

This approach is efficient if a sensor system which can constantly detect a single representative reference point from the target is available. In conventional known sensor systems this generally involves what is known as a radar (radio detection and ranging) system. In these cases, a sensor system based on what is known as Doppler radar is frequently used. As is generally known, this involves transmitting a radar pulse to the target at a particular point in time $T_1$ and detecting the backscattered pulse. A further pulse is transmitted at a later time $T_2$ and the backscattered pulse is again detected.

The radial velocity between the host and the target leads to a phase shift between the two backscattered signals according to the known Doppler effect. The phase shift, the wavelength of the transmitted signal, and the time interval between the two measurements allow the velocity of the target to be calculated in the direction of observation. Velocity components normal to the direction of observation cannot be detected in this way.

Depending on the respective scenario and the resolution of the particular radar system, a representative reference point of the target can not always be observed in order to determine its trajectory. The further an object extends and the more extended its scatter surface is, the harder it is to determine object tracks and velocity therefrom.

In order to alleviate these difficulties, observation merging, a radar signal processing technique which merges a large number of observations has been utilized. If the perspective to the individual measurement points of the system to be observed, known as the object cluster, changes only marginally over time, a satisfactory level of accuracy can be achieved using this method. However, if the perspective changes significantly over time, which is certainly the case for parallel moving objects with considerable relative velocity, this type of evaluation cannot be used.

In addition, in many applications the targets are so extensive that a very widely scattered response signal reaches the radar receiver, with the additional problem that the phase centroids can be regarded as being almost randomly distributed from measurement cycle to measurement cycle. Thus, under such marginal conditions, the conventional evaluation process involving detection, corresponding classification and tracking does not fulfill its purpose.

SUMMARY

An object of the present invention, among others, is to specify an improved method for determining a relative velocity between a host and a target, which allows the absolute velocity difference of the two objects to be simply and reliably estimated, even if the target is extensive and does not allow point-observation of the system to be observed.

The invention assumes that the Doppler frequency as well as the bearing, i.e. the angle between the target point and a reference direction, of an extensive target to be observed can be measured substantially simultaneously from the host. From these data a time characteristic of the Doppler frequency can, according to the invention, be determined as a function of the bearing for each measurement point. The relative velocity between the host and the target can be estimated according to the invention, by determining the radial velocity between the host and the target, which can be calculated from the Doppler frequency, as a proportion of the cosine of the respectively associated bearing and forming an average from this large number of quotients.

BRIEF DESCRIPTION OF THE DRAWINGS

Embodiments of the present invention will be described in more detail hereinafter with reference to the drawings, in which.

DETAILED DESCRIPTION OF THE EMBODIMENT(S)

Figure 1:
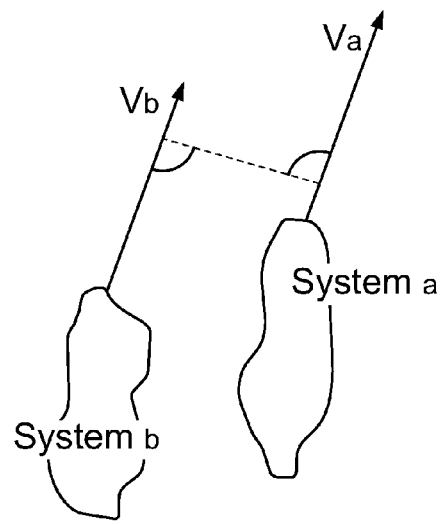
FIG. 1 is a schematic view of two systems moving relative to one another.
Figure 2:
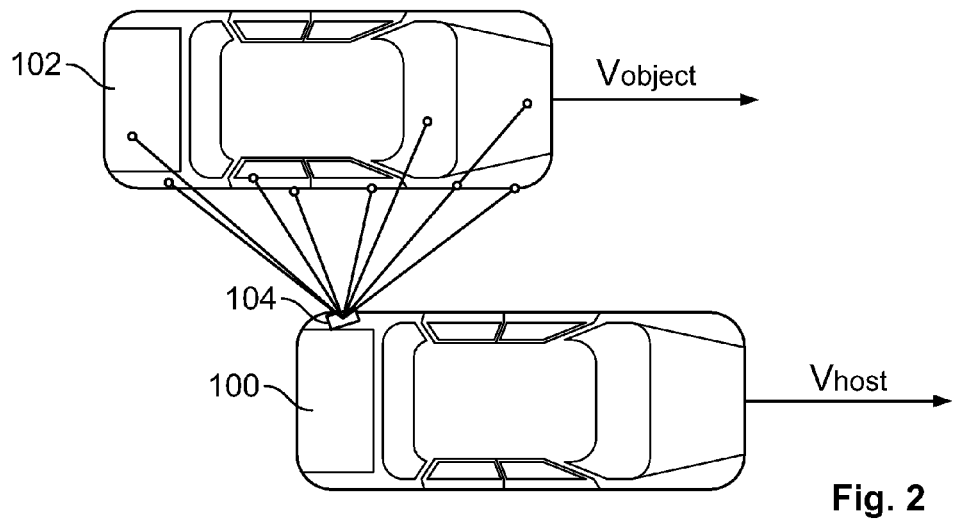
FIG. 2 is a top view of two motor vehicles moving substantially parallel to one another, one of which has a measuring device according to the present invention.

The method according to the invention will be described in more detail hereinafter with reference to FIGS. 2 and 3. As shown in FIG. 2, it is assumed, without loss of generality, that two vehicles, hereinafter referred to as a host 100 and a target 102, move substantially parallel to one another at respective velocities $V_{host}$ and $V_{object}$. The host 100 carries out measurements of the velocity with reference to the target 102.

To achieve this, a Doppler radar measuring device 104 is used in accordance with the invention. A Doppler radar measuring device 104 of this type can determine parameters such as the radial velocity of the target 102, the angle at which the respective measurement point on the target 102 is viewed, and also, for the most part, the distance between the measurement point and the radar device on the basis of a frequency shift and a phase shift between the signal transmitted by the host 100 and the detected backscattered signal.

Figure 3:
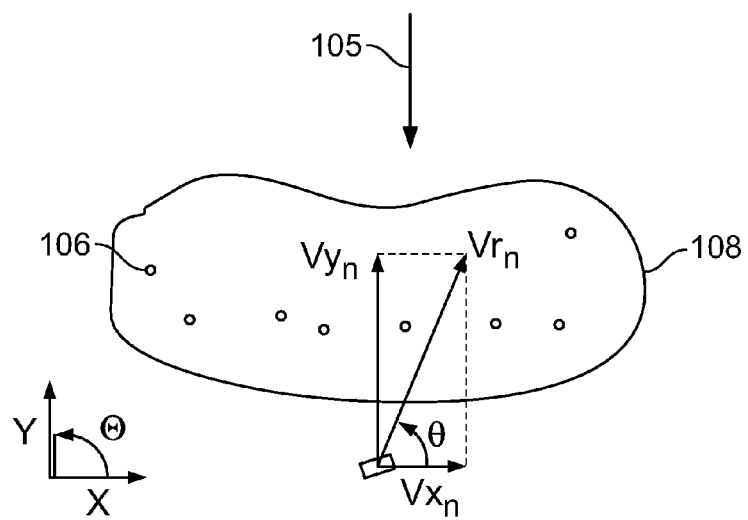
FIG. 3 is schematic view showing the resulting measurements taken from the scenario in FIG. 2.

The process of measuring, indicated by arrow 105, provides the radar image shown in FIG. 3, after high-resolution detection of the backscattered radiation.

This provides information on the radial velocity and the angle θ between the direction of observation and the direction of movement of the host 100 vehicle for a large number of measurement points 106. The radial velocity is determined, for example, from the Doppler frequency and the Doppler phase shift. Information on the range may also be included for each measurement point 106.

This arrangement of measurement points 106 is known as a cloud 108. The desired differential velocity between the host 100 and the target 102 is $$\Delta V = V_{object} - V_{host} \qquad (1)$$

For each individual measurement, a radial velocity, $Vr_n$ is calculated on the basis of the Doppler effect according to the following equation (2):

$$Vr_n = \Delta V \cdot \cos(\theta_n) \qquad (2)$$

If it is assumed that the two vehicles, the host 100 and the target 102 move substantially parallel to one another, the radial velocity will not have a y-component and the relative velocity for each individual measurement point corresponds respectively to the x-component of the velocity $Vx_n$.

As shown in FIG. 3, the x-component of the velocity is calculated for each measurement point 106 according to $$Vx_n = \frac{Vr_n}{\cos(\theta_n)} \qquad (3)$$

The relative velocity, $\Delta V'$ can now be simply estimated according to the invention, by determining the average of the quotients calculated by equation (3). It follows that $$\Delta V' = \overline{\frac{Vr_n}{\cos(\theta_n)}} \qquad (4)$$

A relative velocity between two moving systems can be estimated in a particularly simple manner by using the solution according to the invention. This method makes it possible to distinguish a stationary target from a vehicle located in the blind spot in an advantageous and simple manner due to the fact that stationary targets such as crash barriers or other stationary objects have a considerably different relative velocity to another vehicle located in the blind spot.

This method thus rapidly provides reliable values for the relative velocity if the predetermined spatial direction to which the bearing relates is a direction of movement of the host 100, and the target 102 moves parallel to this direction of movement.

The advantageous properties of the method according to the invention and of a measuring device which uses this method in order to estimate a relative velocity between a host 100 and a target 102 are particularly useful if the items according to the invention are used in a warning system for a motor vehicle. In particular, if the measuring device according to the invention is arranged in a rear seating area of a motor vehicle, monitoring of a blind spot can be ensured safely and rapidly.

However, the invention may, of course, also be advantageously used within expert competence in other fields of application, such as rail transport, shipping, on airport runways and generally in many areas of application of autonomous transportation.

Although an embodiment of the invention has been disclosed here for illustrative purposes, those skilled in the art will appreciate that various modifications, additions and substitutions are possible, without departing from the scope and spirit of the invention as disclosed in the accompanying claims.

What is claimed is:

1. A method for determining a relative velocity between a host and a target comprising the steps of:
    substantially simultaneously determining a value for a radial velocity and a bearing with regard to a predefined spatial direction for a large number of measurement points on the target;
    calculating a large number of quotients from the relative velocity and the cosine of the associated bearing, a quotient being calculated for each of the measurement points, and;
    determining an estimated relative velocity between the host and the target by forming an average of the large number of quotients.

2. The method according to claim 1, wherein the predetermined spatial direction is a direction of movement of the host.

3. The method according to either claim 1, wherein the host and the target move substantially parallel to one another.

4. The method according to claim 1, wherein the step of determining the measurements is carried out by a Doppler radar measuring device.

5. The method according to claim 1, wherein a value for the distance between the target and the host is also determined in the step of determining a value for a radial velocity and a bearing for each measurement point.

6. The method according to claim 1, wherein each measurement corresponds to a backscatter signal of a common transmitted signal transmitted from the host.

7. The method according to claim 1, wherein each measurement corresponds to a backscatter signal which is produced by a transmitted signal different to the other measurements.

8. A measuring device for determining a relative velocity between a host and a target comprising a Doppler radar measuring device located on the host and having a control unit configured to substantially simultaneously determine a value for a radial velocity and a bearing with regard to a predefined spatial direction for a large number of measurement points on the target; calculate a large number of quotients from the relative velocity and the cosine of the associated bearing, a quotient being calculated for each of the measurement points, and; determine an estimated relative velocity between the host and the target by forming an average of the large number of quotients.

9. The measuring device according to claim 8 wherein the host is a motor vehicle.

10. The measuring device according to claim 9 further comprising a warning system associated with the device wherein the warning system produces a warning signal in response to a predetermined signal from the control unit.

* * * * *